(12) United States Patent
Paakkinen (10) Patent No.: US 11,855,571 B2
(45) Date of Patent: Dec. 26, 2023

(54) ARRANGEMENT AND METHOD FOR DYNAMIC BRAKING OF A PERMANENT MAGNET MOTOR AND AN ELEVATOR UTILIZING THEREOF

(71) Applicant: KONE Corporation, Helsinki (FI)

(72) Inventor: Mikko Paakkinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1273 days.

(21) Appl. No.: 16/388,448

(22) Filed: Apr. 18, 2019

(65) Prior Publication Data
US 2019/0348930 A1    Nov. 14, 2019

(30) Foreign Application Priority Data
May 14, 2018    (EP) .................................... 18171972

(51) Int. Cl.
*H02P 3/22*    (2006.01)
*B66B 5/02*    (2006.01)
*B66B 11/04*    (2006.01)
*F16D 63/00*   (2006.01)

(52) U.S. Cl.
CPC .................. *H02P 3/22* (2013.01); *B66B 5/02* (2013.01); *B66B 11/043* (2013.01); *F16D 63/002* (2013.01); *H02P 2207/05* (2013.01)

(58) Field of Classification Search
CPC ...... F16D 63/002; H02P 3/22; H02P 2207/05; B66B 5/02; B66B 11/043; B66B 1/30
USPC ............................ 187/289; 318/759, 757, 727
See application file for complete search history.

(56) References Cited

U.S. PATENT DOCUMENTS

| | | | | |
|---|---|---|---|---|
| 5,070,290 A | * | 12/1991 | Iwasa ........................ | B66B 5/02 318/758 |
| 6,078,156 A | * | 6/2000 | Spurr ........................ | H02P 3/08 318/368 |
| 7,781,997 B2 | * | 8/2010 | Kallioniemi .............. | H02P 6/24 318/722 |
| 7,896,135 B2 | * | 3/2011 | Kattainen ............... | B66B 1/343 187/289 |

(Continued)

FOREIGN PATENT DOCUMENTS

| | | | |
|---|---|---|---|
| CN | 109844946 | * | 6/2019 |
| DE | 10 2010 035 798 A1 | | 3/2011 |

(Continued)

OTHER PUBLICATIONS

Search Report issued in European Patent Application No. 18171972. 5, dated Nov. 13, 2018.

*Primary Examiner* — David Luo
(74) *Attorney, Agent, or Firm* — Birch, Stewart, Kolasch & Birch, LLP (57) ABSTRACT

A method for dynamic braking of a permanent magnet motor, and an elevator utilizing thereof, are presented. The arrangement includes a corresponding number of phase legs and input connectors relative to a number of the plurality of motor windings, wherein each one of the input connectors is coupled to a respective one of the phase legs. At least some of the phase legs comprise at least two semiconductor devices. Second terminals of the phase legs are connected to each other, wherein the arrangement includes a number of semiconductor switches configured for forming a short-circuit between each of the plurality of motor windings.

20 Claims, 5 Drawing Sheets

(56) References Cited

U.S. PATENT DOCUMENTS

2017/0355280 A1* 12/2017 Amler ............... B60L 3/108
2017/0373613 A1   12/2017 Duerr et al.

FOREIGN PATENT DOCUMENTS

| EP | 2 528 226 A1 | 11/2012 |
| EP | 2528226 * | 11/2012 |
| GB | 2560796 A | 9/2018 |

* cited by examiner

ARRANGEMENT AND METHOD FOR DYNAMIC BRAKING OF A PERMANENT MAGNET MOTOR AND AN ELEVATOR UTILIZING THEREOF

TECHNICAL FIELD

The invention concerns in general the technical field of electric motors. The invention concerns especially, however, not exclusively, permanent magnet motors of elevators utilized for moving elevator cars, and dynamic braking of the motors.

BACKGROUND

Dynamic braking of a permanent magnet electric motor is achieved by forming a short-circuit condition between the windings of the motor. By short-circuiting the windings, the back electromotive force of the motor can be utilized to oppose the movement of the rotor and, thus, for dynamic braking of the motor.

Dynamic braking is known to be implemented by using mechanical switches such as motor contactors. The contactors can be arranged to cause short-circuit between the motor windings and, therefore, causing the back electromotive force to slow down the motor. The contactors used for dynamic braking must be chosen to withstand the motor current and to be able to connect and/or disconnect such currents. These contactors tend to be large and costly. Furthermore, the contactors, which include moving parts, have certain limited lifetime and it has to be changed after some relatively small number of operations.

In elevators, additional measures are needed to brake the permanent magnet motor in certain situations. During maintenance, the service technician might need to lower the car without the electrical drive operating the motor by operating mechanical brakes manually. This has the risk of abrupt terminal stop with high velocity if there are no means to reduce the motor speed. In high rise elevators the moving distance can be long if the car has stopped at a difficult position, such as at an express zone.

The combination of mechanical brakes simultaneously with the dynamic brake can create excessive deceleration that should be avoided. During the blackout of the mains supply in the full speed or an emergency stops are situations where the dynamic brake utilization should be considered.

There is thus a need to develop solutions for dynamic braking of a permanent magnet electric motor which are less expensive, fit into a smaller space and have a longer lifetime compared to known solutions.

SUMMARY

An objective of the present invention is to provide an arrangement and a method for dynamic braking of a permanent magnet motor, and an elevator utilizing thereof. Another objective of the present invention is that the arrangement, the method and the elevator provide reliable means for dynamic braking of a permanent magnet motor without the need for mechanical switches and, thus, moving parts.

The objectives of the invention are reached by arrangements, a method and an elevator as defined by the respective independent claims.

According to a first aspect, an arrangement for dynamic braking of a permanent magnet motor comprising a plurality of motor windings is provided. The arrangement comprises a corresponding number of phase legs and input connectors relative to a number of the plurality of motor windings. Each one of the input connectors is coupled to a respective one of the phase legs and second terminals of the phase legs are connected to each other. Each one of the phase legs comprises at least two series-connected semiconductor devices, such as semiconductor diodes or switches. Each one of the input connectors is connected between said at least two series-connected semiconductor devices, and first terminals of the phase legs are connected to each other. The arrangement comprises a number of semiconductor switches configured for forming a short-circuit between each of the plurality of motor windings. The first terminals of the phase legs and the second terminals of the phase legs are further electrically connected to each other. The short-circuit may preferably be arranged via the further electrical connection.

Term "semiconductor device" refers herein to devices utilizing properties of semiconductor materials. Particularly, however not limited to, a semiconductor device may be, for example, a semiconductor diode or a semiconductor switch. Furthermore, the semiconductor material, the properties of which are being utilized, may be, for example, silicon, silicon carbide, germanium, and gallium arsenide, or organic semiconductor material.

Term "semiconductor switch" refers herein to semiconductor devices the operation of which can be controlled, particularly operation related to the conduction of current through the device. Particularly, however not limited to, a semiconductor switch may be, for example, a thyristor, a gate turn-off thyristor, an integrated gate-commutated thyristor (IGCT), an insulated-gate bipolar transistor (IGBT), metal-oxide-semiconductor field-effect transistor (MOSFET), a silicon carbide (SiC) MOSFET, a bidirectional triode thyristor, junction gate field-effect transistor (JFET), or a SIC-JFET.

Furthermore, the two series-connected devices of the phase legs may be semiconductor switches configured for forming the short-circuit between the plurality of motor windings.

At least one of the two series-connected semiconductor devices of each of the phase legs may be one of the number of semiconductor switches configured for forming the short-circuit between the plurality of motor windings.

The at least two series-connected semiconductor devices may be diodes, and the further electrical connection between the first and the second terminals of the phase legs may be configured to be arranged through one of the number of semiconductor switches configured for forming the short-circuit between the plurality of motor windings.

The first terminals and the second terminals of the phase legs may be electrically connected or configured to be electrically connected to each other through a resistor, for example, connected in series with one or several of the number of semiconductor switches. The resistor and/or the one or several of the number of semiconductor switches may preferably be arranged to the further electrical connection between the terminals of the phase legs.

Each one of the two series-connected semiconductor devices may be one of the following type of device: a diode, a thyristor, a gate turn-off thyristor, an integrated gate-commutated thyristor (IGCT), an insulated-gate bipolar transistor (IGBT), metal-oxide-semiconductor field-effect transistor (MOSFET), a silicon carbide (SiC) MOSFET, a bidirectional triode thyristor, junction gate field-effect transistor (JFET), or a SIC-JFET.

The number of semiconductor switches may be one of the following type of semiconductor switch: a thyristor, a gate turn-off thyristor, an integrated gate-commutated thyristor (IGCT), an insulated-gate bipolar transistor (IGBT), metal-oxide-semiconductor field-effect transistor (MOSFET), a silicon carbide (SiC) MOSFET, a bidirectional triode thyristor, junction gate field-effect transistor (JFET), a SiC-JFET.

According to another first aspect, an arrangement for dynamic braking of a permanent magnet motor comprising a plurality of motor windings is provided. The arrangement comprises a corresponding number of phase legs and input connectors relative to a number of the plurality of motor windings. Each one of the input connectors is coupled to a respective one of the phase legs and second terminals of the phase legs are connected to each other. At least a first number of phase legs, wherein the first number is one less than the number of the plurality of motor windings, comprises at least two anti-series-connected semiconductor switches with respective anti-parallel semiconductor devices coupled between the first and second terminals of the phase leg. The at least two anti-series-connected semiconductor switches with respective anti-parallel semiconductor devices of each of the phase legs comprising said switches are configured for forming a short-circuit between the plurality of motor windings.

Said respective anti-parallel semiconductor device may be a separate semiconductor device, such as a diode or an IGBT, connected in anti-parallel with the semiconductor switch, or an intrinsic device in anti-parallel with the semiconductor switch, such as in case of a MOSFET semiconductor switch which has an intrinsic freewheeling diode.

The first number of phase legs may preferably be the same or at least the same as the number of the plurality of motor windings.

Each one of the input connectors may be coupled between the two anti-series-connected semiconductor switches with respective anti-parallel semiconductor devices.

Said each one of the input connectors may be coupled to the first terminal of the respective one of the phase legs.

Said each one of the input connectors may be coupled to the first terminal of the respective one of the phase legs and the second terminals of the phase legs may be coupled to a neutral point (N) of a three-level inverter.

Furthermore, the respective anti-parallel-connected semiconductor devices may be diodes or semiconductor devices. Therefore, there may be a diode, such as a freewheeling diode, connected in anti-parallel with the semiconductor switch of the phase leg, or another semiconductor switch in anti-parallel with the semiconductor switch of the phase leg, thus forming a bidirectionally conducting semiconductor switching device or arrangement.

According to a second aspect, a method for dynamic braking of a permanent magnet motor of an elevator in an emergency condition is provided. The permanent magnet motor comprises a plurality of motor windings and is coupled to an elevator car of the elevator for moving the elevator car. The method comprises:
detecting the emergency condition, and
short-circuiting the plurality of motor windings by an arrangement according to any of the first aspects.

According to a third aspect, an elevator is provided. The elevator comprises an arrangement according to any of the first aspects and a permanent magnet motor comprising a plurality of motor windings. The permanent magnet motor is coupled to an elevator car and arranged to move the elevator car. The arrangement is coupled to the plurality of motor windings by the input connectors of the arrangement. The elevator comprises an elevator control unit configured at least to detect an emergency condition of the elevator and to control the arrangement to short-circuit the motor windings for dynamic braking of the motor.

The elevator may comprise an electrical drive for operating the motor. The electrical drive may be, for example, a frequency converter or an inverter or specifically a three-level neutral point switched converter.

The normal operating conditions refer to conditions in which the elevator serves its landing floors in normal manner. The emergency conditions refer to conditions in which there is, for example, a failure or loss of the main electrical power supply. The emergency conditions may refer also to conditions in which the safety circuit of the elevator has been interrupted thus indicating conditions apart from the normal operating conditions.

The present invention provides an arrangement for dynamic braking of a permanent magnet motor, and a method for dynamic braking of a permanent magnet motor of an elevator and an elevator thereof. The arrangement and the method provides advantages over known solutions such that it prolongs the service life of the arrangement for dynamic braking, improves reliability and safety of the elevator when used in connection with the elevator, and takes less space than the known solutions for dynamic braking.

Various other advantages will become clear to a skilled person based on the following detailed description.

The expression "a number of" refers herein to any positive integer starting from one, e.g. to one, two, three, or four.

The expression "a plurality of" refers herein to any positive integer starting from two, e.g. to two, three, or four.

The terms "first", "second" and "third" do not denote any order, quantity, or importance, but rather are used to distinguish one element from another.

The exemplary embodiments of the present invention presented herein are not to be interpreted to pose limitations to the applicability of the appended claims. The verb "to comprise" is used herein as an open limitation that does not exclude the existence of also un-recited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the present invention are illustrated by way of example and not by way of limitation in the figures of the accompanying drawings briefly described in the following.

DESCRIPTION OF SOME EMBODIMENTS

Figure 1:
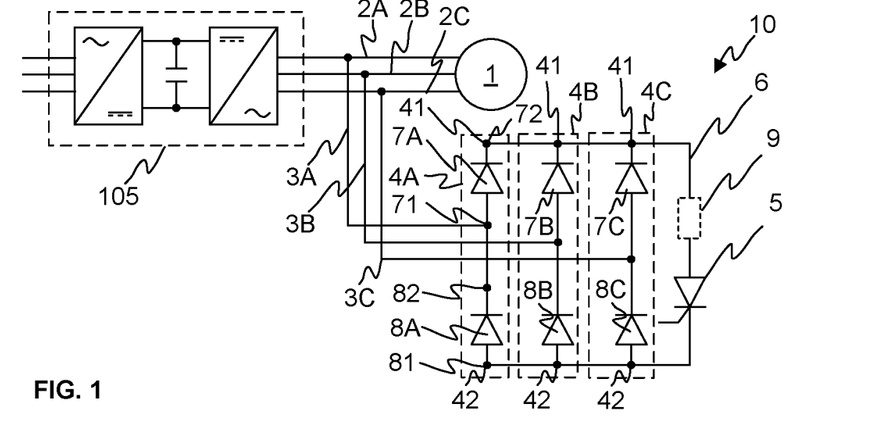
FIGS. 1-9 illustrate schematically arrangements for dynamic braking of a permanent magnet motor according to various embodiments of the present invention.
Figure 2:
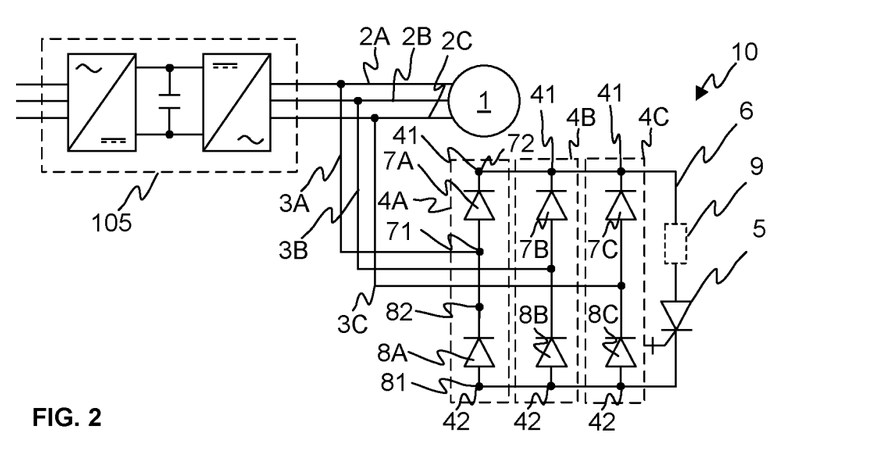
Figure 3:
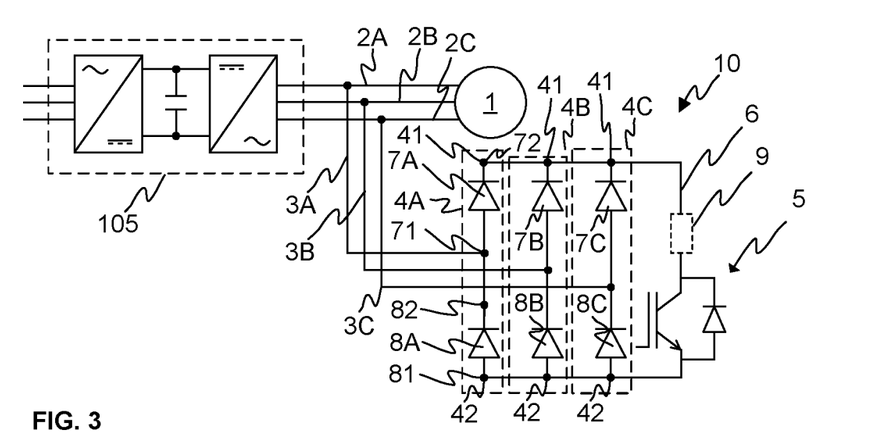

FIGS. 1-3 illustrate arrangements 10 for dynamic braking of a permanent magnet motor 1 according to some embodiments of the present invention. The arrangement 10 comprises a corresponding number of phase legs 4A-4C and input connectors 3A-3C relative to the number of motor windings 2A-2C, in this case, three phase legs 4A-4C and three input connectors 3A-3C as the motor 1 shown is a three-phase permanent magnet motor 1. The input connectors 3A-3C may be coupled, or be at least suitable for coupling, to the motor windings 2A-2C. The arrangement 10 also comprises semiconductor devices 7A-7C, 8A-8C, namely diodes 7A-7C, 8A-8C in this case, however, they may also be semiconductor switches, unidirectionally or bidirectionally conducting semiconductor switching devices, for instance, forming three phase legs 4A-4C, wherein each phase leg 4A-4C comprises two series-connected diodes 7A, 8A; 7B, 8B; 7C, 8C in FIGS. 1-3. First terminals 41 of the phase legs 4A-4C are coupled to each other and second terminals 42 of the phase legs 4A-4C are coupled to each other. Furthermore, each input connector 3A-3C has been coupled to one of said legs 4A-4C, particularly to a point between the two series-connected diodes 7A, 8A; 7B, 8B; 7C, 8C. The diodes 7A, 8A; 7B, 8B; 7C, 8C thus form a three-phase diode bridge. The three-phase diode bridge rectifies AC (alternating current) input voltages, that is, the motor voltages, into a DC (direct current) voltage.

The arrangement 10 may further comprise a further electrical connection 6 between the first 41 and second 42 terminals of the phase legs. The arrangement 10 may further comprise a semiconductor switch 5, for example, a unidirectionally or a bidirectionally conducting switching device, such as a thyristor, a gate turn-off thyristor, an integrated gate-commutated thyristor (IGCT), an insulated-gate bipolar transistor (IGBT), metal-oxide-semiconductor field-effect transistor (MOSFET), a silicon carbide (SiC) MOSFET, a bidirectional triode thyristor, junction gate field-effect transistor (JFET), or a SiC-JFET, or such semiconductor switches connected in anti-parallel, or any suitable semiconductor switch device arranged on the DC side of the diode bridge, preferably in the further electrical connection 6, for forming a short-circuit between the first terminals 41 of the phase legs 4A-4C and the second terminals 42 of the phase legs 4A-4C through the further electrical connection. It should be noted that a bidirectionally conducting semiconductor switching device may be obtained by connecting two unidirectional switches antiparallel with respect to each other.

Terminals of the semiconductor switch 5 may be coupled to the first terminals 41 of the phase legs 4A-4C and to the second terminals of the phase legs 4A-4C, that is, in parallel with the diode bridge, in this case, through the further electrical connection 6. The semiconductor switch 5 may be controlled by applying a control signal, such as a voltage or current, to a control terminal of the semiconductor switch 5, such as to a gate terminal. The control method depends on the type of the semiconductor switch as is known to a person skilled in the art. For example, a thyristor may be controlled so as to conduct current by applying current to the gate of the thyristor as is known to a person skilled in the art. An IGBT may be controlled by applying suitable voltage to the gate terminal of the IGBT.

The semiconductors switch 5 may be arranged to form a short-circuit condition between the motor windings 2A-2C by arranging the switch 5 into conducting state, therefore, implementing the dynamic braking of the motor 1. There may also be a resistor 9, such as a braking resistor 9, connected in series with the switch 5 in which case one of the terminals of the switch 5 is coupled to a terminal of the resistor 9. By utilizing the resistor 9, the short-circuit current can be made smaller with respect to direct short-circuit condition. This further decreases the loading of the motor 1 during the short-circuit condition with respect to the case of direct short-circuit condition. In some embodiments, such as utilizing a thyristor 5, the switch 5 may only be switched into the conducting state while switching it back to the non-conducting state is not possible. However, in some embodiments, such as utilizing controllable switching devices, such as IGBTs, the switch 5 may be controlled to be in the non-conducting state, thus removing the short-circuit condition between the motor windings 2A-2C and, thus dynamic braking, when desirable.

The dynamic braking may, therefore, be implemented by the arrangements 10 shown in FIG. 1-3 by arranging the semiconductor switch 5 permanently or at least for the time during which dynamic braking is to occur into the conducting state, thus, providing short-circuit condition (directly or through a resistor 9) for the motor windings 2A-2C.

Related to the embodiments shown in FIGS. 1-3, there may also be more than two semiconductor devices 7A-7C, 8A-8C in each of the phase legs 4A-4C. There may, for example, be four semiconductor devices comprised in one or several of the phase legs 4A-4C. The semiconductor devices 7A-7C, 8A-8C may be arranged, for example, such that there are two sets of two parallel-connected diodes between which the input connector 3A-3C has been coupled to. There may alternatively be, for example, four series-connected diodes between two of which the input connector 3A-3C has been coupled to. All the semiconductor devices 7A-7C, 8A-8C as well as the input connectors 3A-3C are preferably connected between the terminals 41, 42 of the phase legs 4A-4C.

FIGS. 1-3 further illustrate an electrical drive 105 which may be utilized to operate or drive the permanent magnet motor 1. The electrical drive 105 may be, for example, a frequency converter or an inverter. There may also be filters connected to the input and/or output of the electrical drive 105 (not shown) for filtering at least some of the frequency components of the current and/or voltage on the input or output side of the electrical drive 105. The electrical drive 105 may preferably be communicatively coupled to an elevator control unit 1000 (not shown in FIGS. 1-3). Similar electrical drive 105 may also be utilized in embodiments shown in FIGS. 4-8, however, also different kinds of drives 105 may be used.

Figure 4:
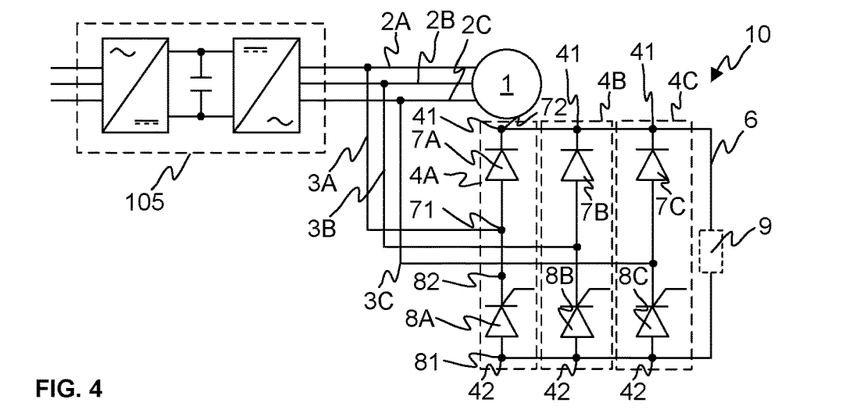
Figure 5:
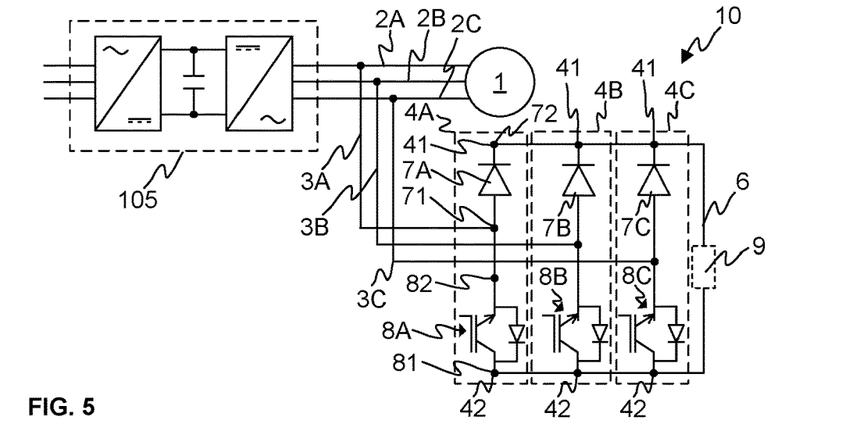

FIGS. 4 and 5 illustrate an arrangement 10 for dynamic braking of a permanent magnet motor 1 according to some embodiments of the present invention. The arrangement 10 comprises a corresponding number of phase legs 4A-4C and input connectors 3A-3C relative to the number of motor windings 2A-2C, in this case, three phase legs 4A-4C and three input connectors 3A-3C as the motor 1 shown is a three-phase permanent magnet motor 1. The input connectors 3A-3C may be coupled, or may at least be suitable for coupling, to the motor windings 2A-2C. The arrangement 10 also comprises six semiconductor devices arranged in similar arrangement as the diodes in FIGS. 1-3, that is two to each of the phase legs 4A-4C, however, three of the diodes have been replaced by semiconductor switches, such as unidirectionally conducting semiconductor switches, e.g. thyristor, or bidirectional switches, e.g. IGBT, or a combination thereof. The arrangement 10 utilizing thyristors is illustrated in FIG. 4 and the one utilizing IGBTs in FIG. 5. It should, however, be noted that although it is illustrated in FIGS. 4 and 5 that the lower semiconductor devices 8A-8C have been replaced by semiconductor switches, it may as well be so that the upper semiconductor devices 7A-7C are replaced by switches or that two of the lower semiconductor devices 7A-7C are semiconductor switches and one of the upper semiconductor devices 8A-8C, or any combination thereof. It may also be such that all of the semiconductor devices 7A-7C, 8A-8C are semiconductor switches or both of the two series-connected semiconductor switches 7A, 8A; 7B, 8B; 7C, 8C of one or several phase legs 4A-4C are semiconductor switches. This provides the advantage of fully controlling the dynamic braking of the motor 1 with semiconductor switches.

In embodiments of FIGS. 4 and 5, each phase leg 4A-4C comprises a series connection of two semiconductor devices 7A-7C, 8A-8C. Said two components may be diodes and semiconductor switches. In FIGS. 4 and 5, second terminals of the diodes 7A-7C are coupled to each other and first terminals 71 of the diodes 7A-7C are respectively coupled to second terminals 82 of the semiconductor switches 8A-8C. First terminals 41 of the phase legs 4A-4C are coupled to each other and second terminals 42 of the phase legs 4A-4C are coupled to each other. Furthermore, each input connector 3A-3C has been coupled to one of said legs 4A-4C, particularly, to a point between a diode 7A-7C and a semiconductor switch 8A-8C of the phase leg 4A-4C. The semiconductor switches 8A-8C may be, for example, thyristors, gate turn-off thyristors, IGCTs, IGBTs, MOSFETs, SiC-MOSFETs, bidirectional triode thyristors, JFETs, or a SiC-JFETs, or any suitable semiconductor switching device, or a combination thereof, for forming short-circuit of the motor windings.

Furthermore in FIGS. 4 and 5, the first terminals 41 of the phase legs 4A-4C are coupled to the second terminals 42 of the phase legs 4A-4C through a further electrical connection 6 directly or, alternatively, through a resistor 9 for obtaining a short-circuit condition.

The dynamic braking may, therefore, be implemented by the arrangements 10 shown in FIGS. 4 and 5 by arranging the semiconductor switches 8A-8C permanently or at least for the time during which dynamic braking is to occur into the conducting state, thus, providing short-circuit condition (directly or through a resistor) for the motor windings 2A-2C.

Figure 6:
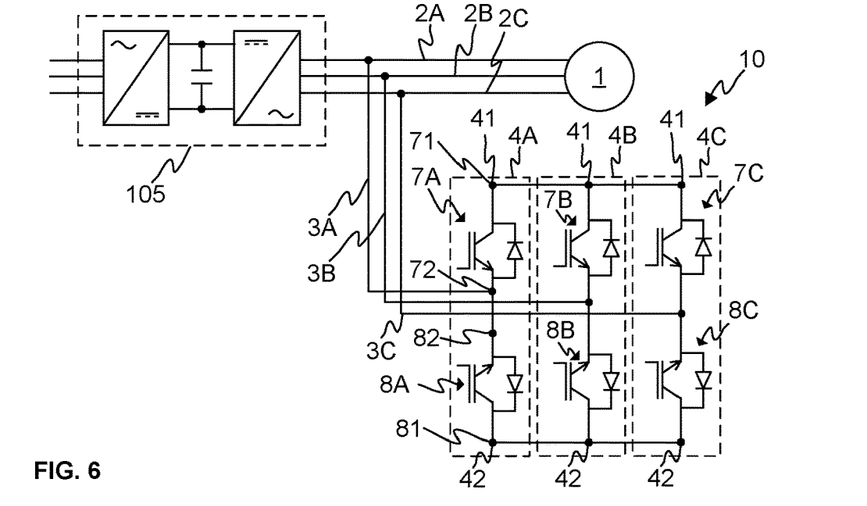

FIG. 6 illustrates schematically an arrangement 10 for dynamic braking of a permanent magnet motor 1 according to an embodiment of the present invention. The arrangement 10 comprises a corresponding number of phase legs 4A-4C and input connectors 3A-3C relative to the number of motor windings 2A-2C, in this case, three phase legs 4A-4C and three input connectors 3A-3C as the motor 1 shown is a three-phase permanent magnet motor 1. The input connectors 3A-3C may be coupled, or may at least be suitable for coupling, to the motor windings 2A-2C. The arrangement 10 also comprises six semiconductor devices arranged in similar arrangement as the diodes in FIGS. 1-3, however, in this case the diodes have been replaced by semiconductor switches, specifically bidirectionally conducting switching devices, e.g. IGBT with anti-parallel-connected diodes, that is, freewheeling diodes, or any other suitable bidirectionally conducting switching devices. Furthermore, contrary to FIGS. 1-5, in FIG. 6 the semiconductor devices of the phase legs 4A-4C are connected in anti-series connection.

According to an embodiment of the present invention, the bidirectionally conducting semiconductor switching devices of each one of the phase legs 4A-4C may be connected in series.

According to an embodiment of the present invention such as shown in FIG. 6, the switches 7A-7B, 8A-8B of each of the two series-connected switches 7A-7B, 8A-8B are connected in anti-series with respect to each other, that is, having the first 71 or the second 72 terminal of one switch 7A-7B, 8A-8B connected to the first 81 or the second 82 terminal of the other switch, respectively. It should be noted that a bidirectionally conducing switching device or arrangement may be obtained by connecting two unidirectionally conducting semiconductor switches in antiparallel to each other.

In FIG. 6, the first terminals 41 of the phase legs 4A-4C are coupled to each other and the second terminals 42 of the phase legs 4A-4C are coupled to each other. Furthermore, each input connector 3A-3C has been coupled to one of said legs 4A-4C, particularly, to a point between the two anti-series-connected semiconductor switches 7A, 8A; 7B, 8B, 7C, 8C. The switches may be, for example, IGBTs, MOSFETs, SiC-MOSFETs, bidirectional triode thyristors, JFETs, or a SiC-JFETs, or any suitable semiconductor switch device, or a combination thereof, for forming short-circuit of the motor windings.

The dynamic braking may, therefore, be implemented by the arrangement 10 shown in FIG. 6 or similar arrangements 10 having anti-series-connected semiconductor switches 7A-7C, 8A-8C with respective anti-parallel semiconductor devices, such as diodes or semiconductor switches, by arranging the semiconductor switches 7A-7C, 8A-8C permanently or at least for the time during which dynamic braking is to occur into the conducting state, thus, providing short-circuit condition for the motor windings 2A-2C. As the anti-series connected switching devices are bidirectionally conducting switching devices, there is no need to arrange a separate short-circuiting route or conductor, that is, a further electrical connection 6, such as in case of arrangements shown in FIGS. 1-5.

Figure 7:
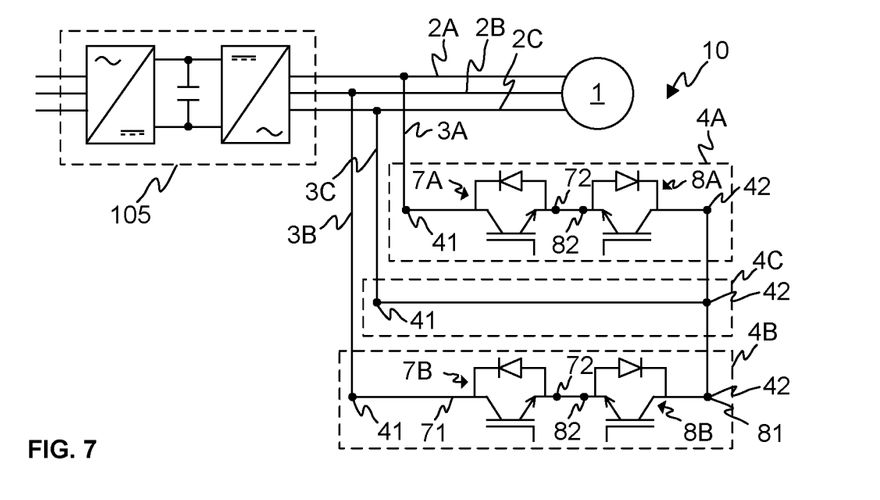

FIG. 7 illustrates arrangements 10 for dynamic braking of a permanent magnet motor 1 according to an embodiment of the present invention. The arrangement 10 comprises a corresponding number of phase legs 4A-4C and input connectors 3A-3C relative to the number of motor windings 2A-2C, in this case, three phase legs 4A-4C and three input connectors 3A-3C as the motor 1 shown is a three-phase permanent magnet motor 1. The input connectors 3A-3C may be coupled, or may at least be suitable for coupling, to the motor windings 2A-2C. The arrangement 10 also comprises four semiconductor switches 7A-7B, 8A-8B with respective anti-parallel semiconductor devices (for example, IGBTs with respective anti-parallel freewheeling diodes) such as there are two anti-series-connected semiconductor switches in two of the three phase legs 4A-4C, that is, one less than the number of motor windings 2A-2C.

In order to achieve the desired dynamic braking effect, the semiconductor switches 7A-7B, 8A-8B of each of the two anti-series-connected semiconductor switches 7A-7B, 8A-8B are connected in anti-series with respect to each other as can be seen in FIG. 7, that is, having the first 71 or the second 72 terminal of one switch 7A-7B, 8A-8B connected to the first 81 or the second 82 terminal of the other switch, respectively. The semiconductor switches 7A-7B, 8A-8B are omitted from the third phase leg and it provides short-circuit condition for the third motor winding when the semiconductor switches of the other two phase legs are in conducting state.

Figure 8:
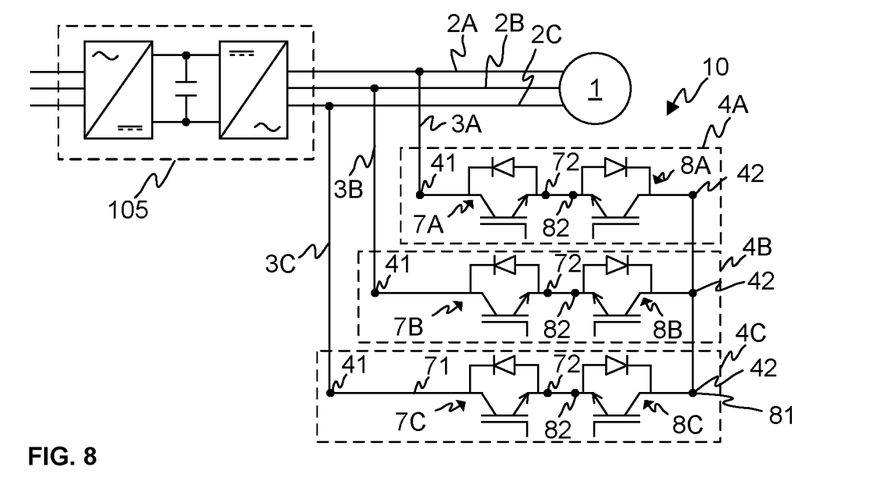

FIG. 8 illustrates arrangements 10 for dynamic braking of a permanent magnet motor 1 according to an embodiment of the present invention. The arrangement 10 comprises a corresponding number of phase legs 4A-4C and input connectors 3A-3C relative to the number of motor windings 2A-2C, in this case, three phase legs 4A-4C and three input connectors 3A-3C as the motor 1 shown is a three-phase permanent magnet motor 1. The input connectors 3A-3C may be coupled, or may at least be suitable for coupling, to the motor windings 2A-2C. The arrangement 10 also comprises six semiconductor devices 7A-7C, 8A-8C with respective anti-parallel semiconductor devices (for example, IGBTs) with respective anti-parallel semiconductor devices such as there are two anti-series-connected semiconductor switches in each of the phase leg 4A-4C. In order to achieve the desired dynamic braking effect, the switches 7A-7C, 8A-8C of each of the two series-connected switches are connected in anti-series with respect to each other as can be seen in FIG. 8, that is, having the first 71 or the second 72 terminal of one switch connected to the first 81 or the second 82 terminal of the other switch, respectively.

The dynamic braking may, therefore, be implemented by the arrangements 10 shown in FIGS. 7 and 8 by arranging the semiconductor switches permanently or at least for the time during which dynamic braking is to occur into the conducting state, thus, providing short-circuit condition for the motor windings 2A-2C.

Figure 9:
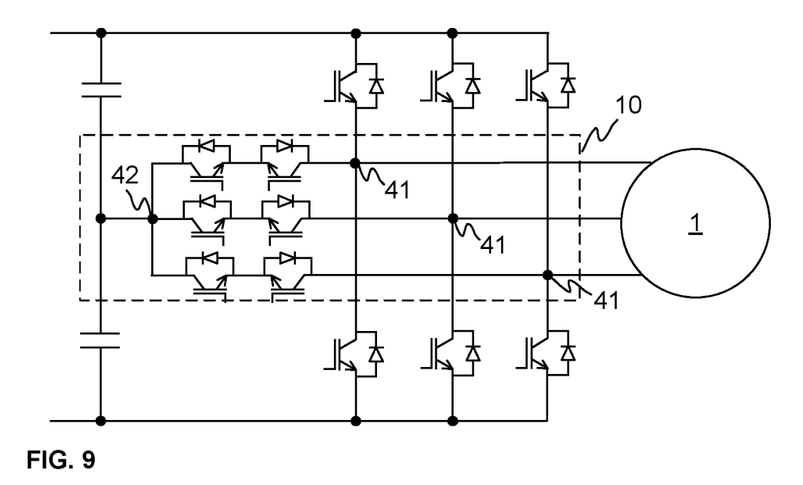

FIG. 9 illustrates arrangements 10 for dynamic braking of a permanent magnet motor 1 according to an embodiment of the present invention. In FIG. 9, the electrical drive 105 is a three-level inverter, particularly a three-level neutral point switched 2 (3L-NPC2) inverter. However, it should be noted that there are various kinds of three-level neutral point switched inverters known to a skilled person. According to this embodiment, the neutral point switch may be used for dynamic braking of the motor 1. As can be seen, the neutral point switch utilizes a similar arrangement to the arrangement as shown in FIG. 8 with the exception that the short-circuited terminals of the semiconductor switching devices or arrangements of each phase leg have further been connected to the neutral point of the three-level inverter. Thus, there are two bidirectionally conducting anti-series-connected switching devices (for example, ones of the type mentioned hereinearlier) on each phase leg of the neutral point switch.

Electrical power to operate the switches of the neutral point switch may be taken from the energy storage such as from input capacitors of the 3L-NPC2 inverter or the intermediate circuit of the electrical drive 105, such as of a frequency converter. The energy storage may be charged by utilizing regenerative braking of the motor 1, for instance.

The dynamic braking may, therefore, be implemented by the arrangement 10 shown in FIG. 9 by arranging the semiconductor switches permanently or at least for the time during which dynamic braking is to occur into the conducting state, thus, providing short-circuit condition for the motor windings 2A-2C. During this time, the other switches of the frequency converter or the inverter are preferably arranged to be in non-conducting state.

With respect to each embodiment of the present invention shown in FIGS. 1-9, the dynamic braking arrangement 10 may advantageously be utilized in elevators 100, for example, in an emergency situation, such as loss of mains or an emergency stop situation. In the emergency situation, the electrical drive 105 seizes to modulate its switches and the switches of the arrangement 10 may be switched to conducting state in order to provide dynamic braking, that is, by forming a short-circuit condition between the motor windings 2A-2C. Particularly in case of the embodiment shown in FIG. 9, the modulation or switching of the other switches of the inverter is being halted while the switches of the neutral point switch may be switched permanently or at least for the time during which dynamic braking is to occur into the conducting state, thus, providing short-circuit condition for the motor windings 2A-2C.

Figure 10:
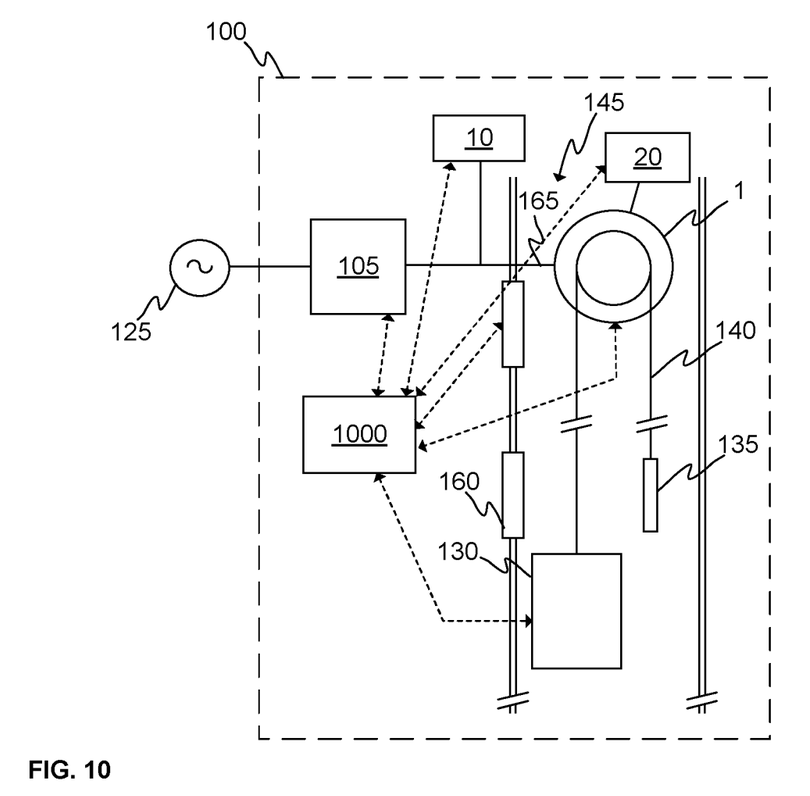
FIG. 10 illustrates schematically an elevator according to an embodiment of the present invention.

FIG. 10 illustrates schematically an elevator 100 according to an embodiment of the present invention. The elevator 100 may comprise a permanent magnet motor 1 for moving an elevator car 130 comprised in the elevator 100. The elevator car 130 may be mechanically coupled to the motor 1, for example, by hoisting means 140, such as a rope 140 or by hydraulic means. The operation of the motor 1 may be controlled by an electrical drive 105 such as a frequency converter 105 or an inverter 105.

The hoisting means 140 may comprise, for example, steel or carbon fibers. The term 'hoisting means' does not limit the form of the element anyhow. For example, the hoisting rope 140 may be implemented as a rope or a belt.

The elevator 100 preferably also comprises an elevator brake 20 such as an electromechanical brake 20. The elevator brake 20 may comprise components such as a brake caliper and/or a brake drum. Furthermore, the brake 20 may comprise electronics for operating the brake 20, that is, for activating and/or deactivating the brake 20.

The elevator 100 may comprise an elevator control unit 1000 for controlling the operation of the elevator 100. The elevator control unit 1000 may be a separate device or may be comprised in the other components of the elevator 1000 such as in or as a part of the electrical drive 105. The elevator control unit 1000 may also be implemented in a distributed manner so that, e.g., one portion of the elevator control unit 1000 may be comprised in the electrical drive 105 and another portion in the elevator car 130. The elevator control unit 1000 may also be arranged in distributed manner at more than two locations or in more than two devices.

The elevator 100 may comprise an arrangement 10 for dynamic braking of the motor 1. The arrangement 10 is preferably coupled to the motor windings 2A-2C of the motor 1 close to the motor 1 so that the arrangement 10 may be implemented for efficient short-circuiting of the motor windings 2A-2C. Preferably, there are no additional components or equipment coupled between the arrangement 10 and the motor 1.

The normal operating conditions refer to conditions in which the elevator 100 serves its landing floors in normal manner. The emergency conditions refer to conditions in which there is, for example, a failure or loss of the main electrical power supply 125. The emergency conditions may refer also to conditions in which the safety circuit of the elevator 100 has been interrupted thus indicating conditions apart from the normal operating conditions. The emergency conditions may be detected, for example, by measuring the voltage level of the main power supply 125 or input or output voltage of the electrical drive 105 or the input of the arrangement 10 for dynamic braking of the motor 1.

Other elements shown in FIG. 10, which may or may not be utilized in embodiments of the present invention, are a main electrical power supply 125 such as a three- or single-phase electrical power grid, an electrical connection of the arrangement 10, that is, the input connectors 3A-3B, connection means 165 between the electrical drive 105 and the electric motor 1. The elevator car 130 may operate in a hoistway 145 serving landing floors 160. There may or may not be a counter-weight 135 utilized in an embodiment of the present invention.

Figure 11:
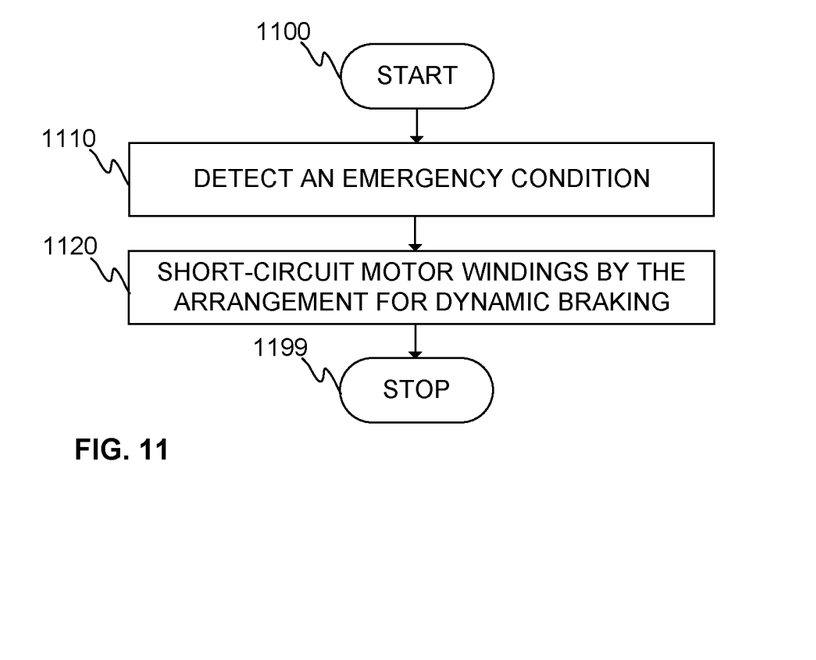
FIG. 11 illustrates a flow diagram of a method according to an embodiment of the present invention.

FIG. 11 illustrates a flow diagram of a method in accordance with an embodiment of the present invention.

Step 1100 refers to a start-up phase of the method. Suitable equipment and components are obtained and systems assembled and configured for operation.

At 1110, the emergency condition of the elevator 100 may be being detected, if any. The detection 1110 may be based on measured voltage of the main power supply 125, the voltage of the electrical drive 105, either input or output voltage, or in response to a safety circuit related event, or the detection signal may be obtained from some other source communicatively coupled to the elevator control unit 1000.

At 1120, the motor windings 2A-2C are being short-circuited by utilizing an embodiment of the arrangement 10 as described hereinearlier. The arrangement 10 may be such as illustrated and described in connection with any of FIGS. 1-9 or some other kind of an arrangement 10 within the scope of the present invention.

Once the motor windings 2A-2C has been short-circuited and the elevator car 130 is moving, there is short-circuit current flowing in through the arrangement 10. At least the semiconductor switches which are necessarily required for forming the short-circuit may then, preferably, be continuously, or permanently, in conducting state in order to provide the dynamic braking of the motor 1. The elevator car 130 may then be stopped completely and fixed into its place at the desired position by activating the elevator brake 20.

Method execution is stopped at step 1199. The method may be repeated continuously, intermittently, or on demand. Preferably, the method may be implemented during emergency condition of the elevator 100. The method enhances the reliability and safety of the elevator 100 with respect to known solutions.

Figure 12:
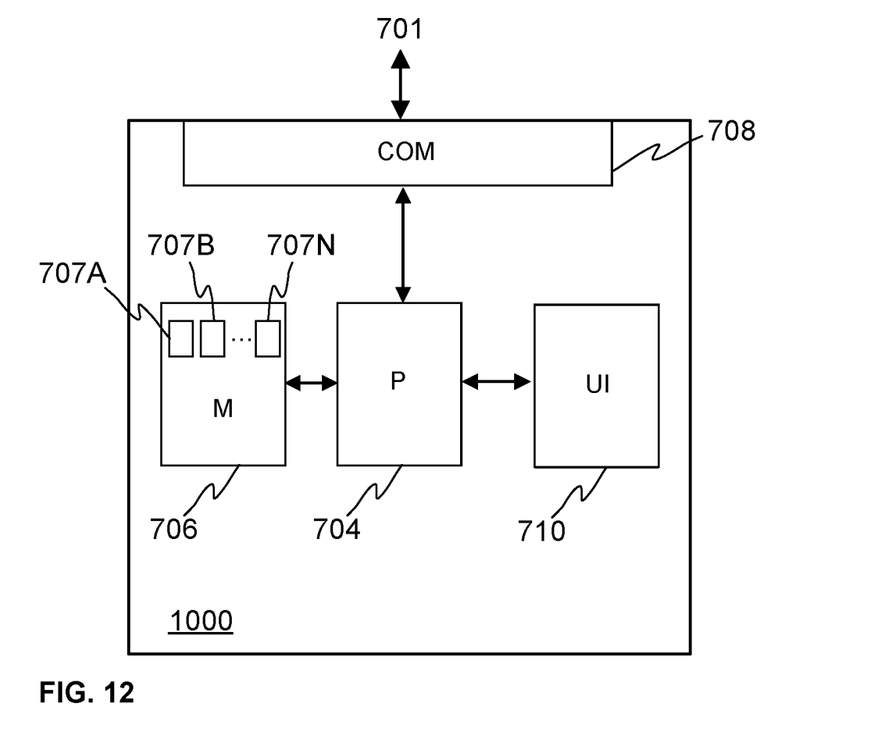
FIG. 12 illustrates schematically an elevator control unit according to an embodiment of the present invention.

FIG. 12 illustrates schematically an elevator control unit 1000 according to an embodiment of the present invention. External units 701 may be connected to a communication interface 708 of the elevator control unit 1000. External unit 701 may comprise wireless connection or a connection by a wired manner. The communication interface 708 provides interface for communication with external units 701 such as the elevator car 130, the motor 1, the doors of the landing floors 160, or the electrical drive 105 to the elevator control unit 1000. There may also be connecting to the external system, such as a laptop or a handheld device. There may also be a connection to a database of the elevator 1000 or an external database including information used in controlling the operation of the elevator 1000.

The elevator control unit 1000 may comprise one or more processors 704, one or more memories 706 being volatile or non-volatile for storing portions of computer program code 707A-707N and any data values and possibly one or more user interface units 710. The mentioned elements may be communicatively coupled to each other with e.g. an internal bus.

The processor 704 of the elevator control unit 1000 is at least configured to implement at least some method steps as described hereinabove. The implementation of the method may be achieved by arranging the processor 704 to execute at least some portion of computer program code 707A-707N stored in the memory 706 causing the processor 704, and thus the elevator control unit 1000, to implement one or more method steps as described, for example, however, not necessarily all steps and not limited to, to detect an emergency condition, and to control the semiconductor switches of the arrangement 10 into conducting state short-circuiting the motor windings 2A-2C. The processor 704 is thus arranged to access the memory 706 and retrieve and store any information therefrom and thereto. For sake of clarity, the processor 704 herein refers to any unit suitable for processing information and control the operation of the elevator control unit 1000, among other tasks. The operations may also be implemented with a microcontroller solution with embedded software. Similarly, the memory 706 is not limited to a certain type of memory only, but any memory type suitable for storing the described pieces of information may be applied in the context of the present invention.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An arrangement for dynamic braking of a permanent magnet motor comprising a plurality of motor windings, consisting essentially of:
   a number of phase legs and input connectors corresponding to a number of the plurality of motor windings, the phase legs being parallel to each other; and
   an electrical connection in parallel with the phase legs, the electrical connection comprising a switch in series with a resistor,
   wherein each one of the input connectors is coupled to a respective one of the phase legs and second terminals of the phase legs are connected to each other,
   wherein each one of the phase legs comprises at least two series-connected semiconductor devices,
   wherein each one of the input connectors is connected between said at least two series-connected semiconductor devices, and first terminals of the phase legs are connected to each other,
   wherein the arrangement comprises a number of semiconductor switches configured for forming a short-circuit between each of the plurality of motor windings, and
   wherein the first terminals of the phase legs and the second terminals of the phase legs are further electrically connected to each other.

2. The arrangement according to claim 1, wherein at least one of the two series-connected semiconductor devices of each of the phase legs is one of the number of semiconductor switches configured for forming the short-circuit between the plurality of motor windings.

3. The arrangement according to claim 2, wherein the first terminals and the second terminals of the phase legs are electrically connected or configured to be electrically connected to each other through a resistor.

4. The arrangement according claim 2, wherein each one of the two series-connected semiconductor devices is one of the following type of component: a diode, a thyristor, a gate turn-off thyristor, an integrated gate-commutated thyristor (IGCT), an insulated-gate bipolar transistor (IGBT), metal—oxide—semiconductor field-effect transistor (MOSFET), a silicon carbide (SiC) MOSFET, a bidirectional triode thyristor, junction gate field-effect transistor (JFET), or a SIC-JFET.

5. The arrangement according to claim 1, wherein said at least two series-connected semiconductor devices of each one of the phase legs are semiconductor diodes, and the further electrical connection between the first and the second terminals of the phase legs is configured to be arranged through one of the number of semiconductor switches configured for forming the short-circuit between the plurality of motor windings.

6. The arrangement according to claim 5, wherein the first terminals and the second terminals of the phase legs are electrically connected or configured to be electrically connected to each other through a resistor.

7. The arrangement according claim 5, wherein each one of the two series-connected semiconductor devices is one of the following type of component: a diode, a thyristor, a gate turn-off thyristor, an integrated gate-commutated thyristor (IGCT), an insulated-gate bipolar transistor (IGBT), metal—oxide—semiconductor field-effect transistor (MOSFET), a silicon carbide (SiC) MOSFET, a bidirectional triode thyristor, junction gate field-effect transistor (JFET), or a SIC-JFET.

8. The arrangement according to claim 1, wherein the first terminals and the second terminals of the phase legs are electrically connected or configured to be electrically connected to each other through a resistor.

9. The arrangement according to claim 1, wherein each one of the two series-connected semiconductor devices is one of the following type of component: a diode, a thyristor, a gate turn-off thyristor, an integrated gate-commutated thyristor (IGCT), an insulated-gate bipolar transistor (IGBT), metal—oxide—semiconductor field-effect transistor (MOSFET), a silicon carbide (SiC) MOSFET, a bidirectional triode thyristor, junction gate field-effect transistor (JFET), or a SIC-JFET.

10. The arrangement according to claim 1, wherein the number of semiconductor switches is one of the following type of semiconductor switch: a thyristor, a gate turn-off thyristor, an integrated gate-commutated thyristor (IGCT), an insulated-gate bipolar transistor (IGBT), metal—oxide—semiconductor field-effect transistor (MOSFET), a silicon carbide (SiC) MOSFET, a bidirectional triode thyristor, junction gate field-effect transistor (JFET), a SiC-JFET.

11. A method for dynamic braking of a permanent magnet motor of an elevator in an emergency condition, wherein the permanent magnet motor comprises a plurality of motor windings and is coupled to an elevator car of the elevator for moving the elevator car, wherein the method comprises:
   detecting the emergency condition; and
   short-circuiting the plurality of motor windings by an arrangement according to claim 1.

12. An elevator comprising:
   the arrangement according to claim 1; and
   a permanent magnet motor comprising:
      a plurality of motor windings, wherein the permanent magnet motor is coupled to an elevator car and arranged to move the elevator car, and wherein the arrangement is coupled to the plurality of motor windings by the input connectors; and
      an elevator control unit configured at least to detect an emergency condition of the elevator and to control the arrangement to short-circuit the motor windings for dynamic braking of the motor.

13. The elevator according to claim 12, further comprising an electrical drive for operating the motor.

14. The elevator according to claim 13, wherein the electrical drive is a three-level neutral point switched converter.

15. An arrangement for dynamic braking of a permanent magnet motor comprising a plurality of motor windings, consisting essentially of:
   a corresponding number of phase legs and input connectors relative to a number of the plurality of motor windings, the phase legs being parallel to each other; and
   an electrical connection in parallel with the phase legs, the electrical connection comprising a switch in series with a resistor,
   wherein each one of the input connectors is coupled to a respective one of the phase legs and second terminals of the phase legs are connected to each other,
   wherein at least a first number of phase legs, wherein the first number is one less than the number of the plurality of motor windings, comprises at least two anti-series-connected semiconductor switches with respective anti-parallel semiconductor devices coupled between the first and second terminals of the phase leg, and
   wherein the at least two anti-series-connected semiconductor switches with respective anti-parallel semiconductor devices of each of the phase legs comprising said switches are configured for forming a short-circuit between the plurality of motor windings.

16. The arrangement according to claim 15, wherein the first number of phase legs is the same as the number of the plurality of motor windings.

17. The arrangement according to claim 16, wherein each one of the input connectors is coupled between the two anti-series-connected semiconductor switches with respective anti-parallel semiconductor devices.

18. The arrangement according to claim 16, wherein said each one of the input connectors is coupled to the first terminal of the respective one of the phase legs and the second terminals of the phase legs are coupled to a neutral point (N) of a three-level inverter.

19. The arrangement according to claim 15, wherein said each one of the input connectors is coupled to the first terminal of the respective one of the phase legs.

20. The arrangement according to claim 15, wherein said respective anti-parallel-connected semiconductor devices are diodes or semiconductor switches.

* * * * *